LEAD WIRE EXIT FOR ELECTRICAL APPARATUS

Filed July 23, 1964

2 Sheets-Sheet 1

Inventor:
Walter S. Koke
By: Zabel, Baker, York, Jones & Dithmar
Attorneys

Inventor:
Walter S. Koke
By: Zabel, Baker, York, Jones & Dithmar
Attorneys 3,299,201

LEAD WIRE EXIT FOR ELECTRICAL APPARATUS

Walter S. Koke, Homewood, Ill., assignor to Jefferson Electric Company, Bellwood, Ill., a corporation of Delaware Filed July 23, 1964, Ser. No. 384,695
4 Claims. (Cl. 174—65)

The present invention relates to an improved arrangement for bringing leads through the casing of electrical apparatus, such as transformers and ballasts, referred to herein as a "lead wire exit."

In the usual arrangement, the casing of the apparatus has a hole, and two leads are threaded through the hole, then soldered to the terminals of the apparatus, and then the apparatus as a whole is potted. The threading operation involves labor cost.

However, in the case of ballasts in which the potting is done under pressure, as with an epoxy compound for instance, there is a certain amount of leakage of the potting material through the hole; that is, through the space between the edge of the hole and the insulation of the leads. This has been overcome by the use of a cardboard barrier in the previous arrangements.

The present arrangement facilitates the assembly by providing a groove, it being easier to lay the leads in a groove than it is to thread them through an opening.

An object of the invention is to provide a groove such that the shape of the opening reduces the tendency of the potting compound to leak past the conductors.

One of the disadvantages of the groove arrangement as contrasted with a hole is that the transformer or ballast is subject to a certain amount of handling after the inner ends of the leads have been soldered to the core and coil assembly but before potting, and the leads will spring out of the groove so that they must be repositioned. Thus an extra manual operation is required in repositioning the same when the cover is applied.

Another object is to provide a lead wire exit in the form of a groove which is closed by another casing part, such as a cover, but which at the same time is so constructed that the leads will lock themselves into the groove even though the cover has not yet been applied.

Another disadvantage of prior arrangements is that unfortunately the help is inclined to yank the unpotted apparatus around by the leads, and this tends to break the soldered connection between the leads and the core and coil assembly.

Another object of my invention is to provide an arrangement which provides a certain amount of strain relief so that the soldered connections will not be damaged when it is pulled around by the leads.

Other objects, features, and advantages of my invention will become apparent as the description proceeds.

With reference now to the drawings in which like reference numerals designate like parts:

Figure 1:
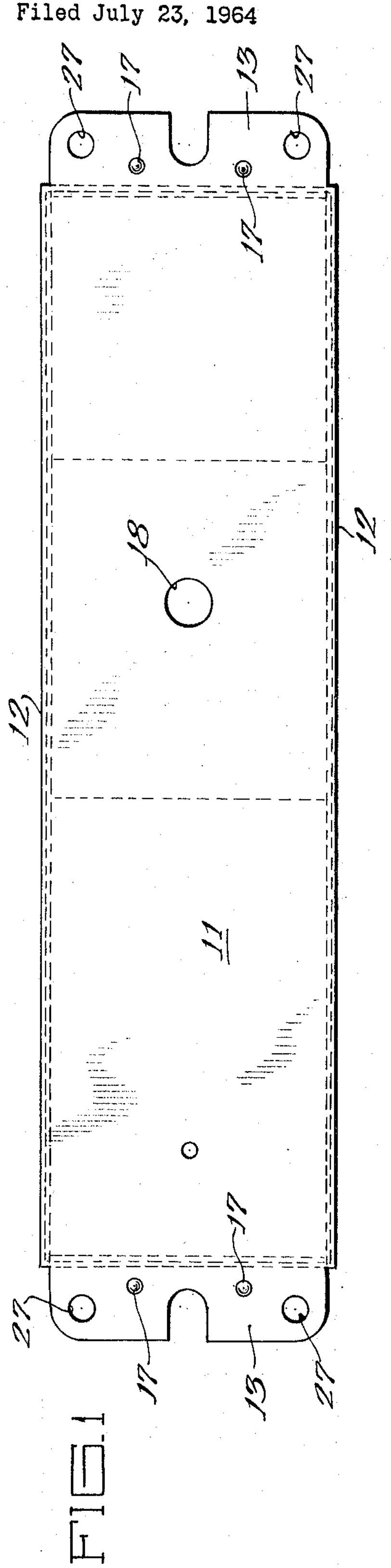
FIG. 1 is a plan view shown in the preferred embodiment of my invention.
Figure 2:
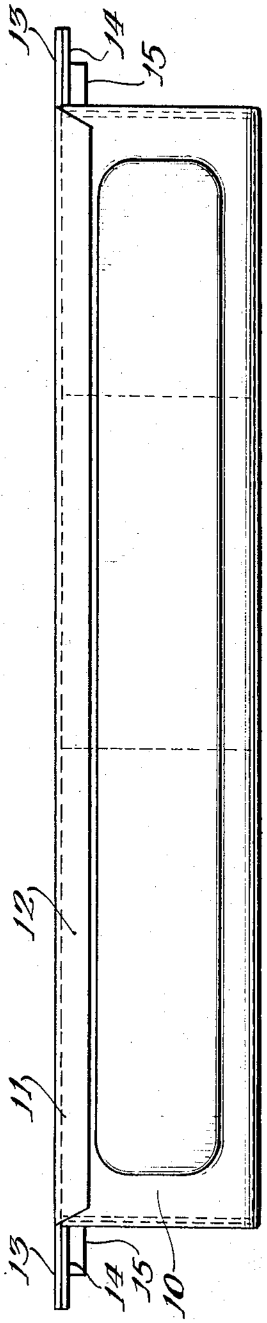
FIG. 2 is a side elevation.

As shown in FIGS. 1 and 2, the enclosure comprises a casing 10 and a cover 11. The cover has downturned flanges 12 which brace the upper edge of the side walls of the casing 10, and at either end is provided with horizontal end lips 13. The casing 10 also has horizontal end lips 14 in surface contact with the cover lips 13.

Grooves 15 are formed in the casing lip 14 to receive different pairs of leads 30. Thus, a pair of leads 30, soldered (28) at one end to a terminal clip 29 of the core and coil assembly (not shown), may be laid in a groove 15, and then the cover applied, instead of having to thread the two leads through a hole in the end wall of the casing.

The grooves 15 are wider than they are high so as to accommodate two leads, and a ridge 16 is provided in the middle of groove 15 making a double groove. A projection 17 is embossed in the cover lip 13 at a point overlying the ridge 16. Thus the shape of the opening between the two lips closely approximates the figure 8 shape of two leads lying side by side. This cuts down on the leakage of potting compound around the leads.

In the embodiment shown, the apparatus is potted under pressure after the cover has been applied. To this end, a hole 18 is provided in the cover through which the potting compound is injected under a pressure of from 30 to 50 pounds per square inch. Being viscous, the fluid pressure at the groove is only a fraction of the nozzle pressure, say 3 or 4 pounds. The opening shape has been found effective to prevent any substantial leakage under these conditions.

Groove 15 extends for only about half the length (longitudinal dimension of the ballast) of the lip 14. In other words, the lip 14 includes a remote portion 20 which is coplanar with the remainder of the lip. A slot 21 is cut in the remote portion which is centered with respect to the ridge 16. However, the slot 21 is only about half the width of the groove 15, thus providing wings 22 which bound the slot. In assembly, the leads are inserted through the slot 21 and into the groove 16 one by one, but once they have been positioned side by side in the groove, they are retained in that position by the wings 22. In other words, the wings 22 provide an interlocking effect which prevents the leads from popping up out of the groove.

Figure 5:
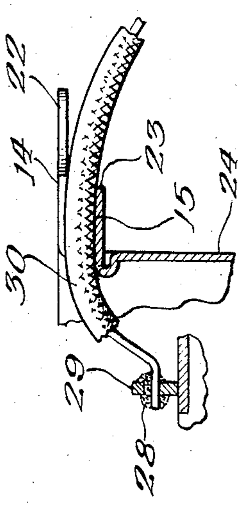
FIG. 5 is a section along line 5—5 of FIG. 4 showing the strain relief feature.

As shown in FIG. 5 the vertical distance between the undersurface of the wing 22 and the bottom surface of the groove 15 is equal to or slightly less than the diameter of the lead. To the extent that there is a very slight interference, there will be a frictional engagement of the lead with the wing 22 which serves as a strain relief. The interference, however, must be sufficiently small as to avoid damage to the insulation.

Since the edge 23 of the groove 16 is spaced from the corresponding edge of the wings 22, the curvature assumed by the leads 30 (see FIG. 5) prior to the placement of the cover avoids any clamping effect which would abrade the insulation. The frictional engagement evidences itself when the leads 30 are straightened out by pulling.

The grooves 15 are formed by a stamping operation which provides a smooth fold 31 at the inner surface of the end wall 24 thus providing a rounded bead to prevent sharp bends in the leads. By making the end wall 24 as a separate piece it is possible to subject it to the desired stamping operation. The end walls 24 are spot welded at 25 to flanges 26.

Figures 3, 4, 6, 7, 8:
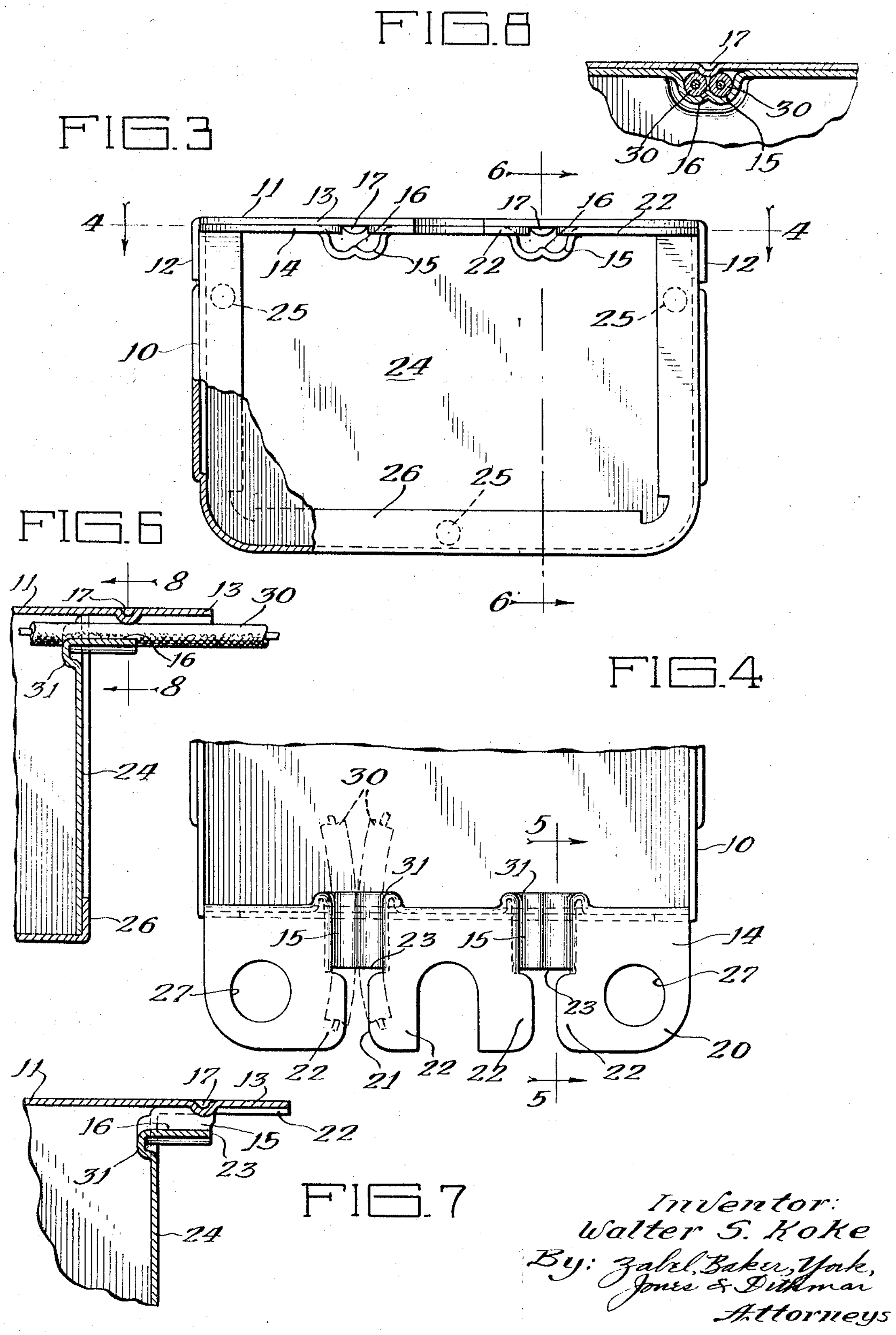
FIG. 3 is an enlarged end view, partly broken away.
FIG. 4 is a fragmentary plan view of the casing without the cover, being taken along line 4—4 of FIG. 3.
FIG. 6 is a vertical section taken along lines 6—6 of FIGS. 3 and 4 showing a lead in place.
FIG. 7 is a view similar to FIG. 6 but without the lead.
FIG. 8 is a vertical transverse section taken along line 8—8 of FIG. 6.

In operation, the soldered connections 28 may be made before the core and coil assembly is placed in the casing 10. After placing, the several lead pairs are laid in their respective grooves, there being eight leads and four double grooves in a rapid start ballast. The leads 30 of each pair are inserted one by one through the slot 21; the wings 22 prevent popping out, as shown in FIGS. 4 and 5.

The ballast may be pulled around by the leads 30, either before or after cover placement and incident to potting without breaking the soldered connection 28.

The lips 13–14 can be secured to each other by crimped tabs or spot welding (not shown).

The arrangement shown provides an exit which is in effect a two part sleeve 13–15 which does not require upward deformation of the cover lip 13. Thus the assembly 10–11 can be mounted in full surface contact with a suitable support, such as a fixture channel, because the cover 11 is coplanar. Suitable aligned screw holes 27 are provided for mounting.

The FIGURE 8 shape provided by the opening 13–15–16–17 prevent leakage during pressure filling through the opening 18. More specifically, due to the length of the sleeve 13–15 and the viscosity of the potting compound, it has been found that flow of the potting compound is arrested by the time it reaches the outer end of the sleeve 13–15.

For example where the leads 30 are of diameter of .113 inch, the groove 15 is .228 inch wide (tolerance; plus or minus .002) and .114 inch deep (tolerance; plus or minus .001), and $\frac{5}{16}$ inch long. Due to this close fit between the leads 30 and the sleeve 13–15, the two leads will be firmly anchored in a definite and aligned position irrespective of the potting compound.

Although only a preferred embodiment of my invention has been shown and described herein, it will be understood that various modifications and changes may be made in the construction shown without departing from the spirit of my invention, as pointed out in the appended claims.

I claim:

1. A lead wire exit for electrical apparatus which includes two casing parts, comprising a lip formed on each casing part, said lips being in contact with each other after assembly, one of said lips being deformed over a portion of its width to provide a lead wire receiving groove and having an undeformed coplanar portion extending beyond said groove, a slot in said coplanar extended portion extending in the same direction as said groove and communicating therewith, said slot having a width substantially equal to the diameter of a lead wire, said slot providing a wing portion at one side thereof which partially overlies a lead wire disposed in said groove to maintain said lead wire in said groove prior to the time that the lip of said other casing part is placed over said groove.

2. A lead wire exit for electrical apparatus which includes two casing parts, comprising a lip formed on each casing part, said lips being in contact with each other after assembly, one of said lips being deformed over a portion of its width to provide a double width lead receiving groove and having an undeformed coplanar portion extending beyond said groove, a slot in said coplanar extended portion having a width less than the width of said groove and being substantially centered with respect to the width of said double width groove, said slot providing oppositely disposed wings at either side thereof, whereby each one of the pair of wires disposed side by side in said groove will be partially overlain by said wings to maintain said wires in said groove against springing up prior to the time that the lip of said other casing part is placed over said groove.

3. A lead wire exit as claimed in claim 2 in which the vertical distance between the undersurface of said wing and bottom of said groove is no greater than the diameter of one of said leads to provide a frictional engagement between the surface of said leads and said groove and wing to provide a strain relief.

4. A lead wire exit for a ballast which includes a casing, a cover for said casing having a coplanar lip at one end, and a pair of lead wires, comprising lip formed on said casing in contact with said cover lip, said casing lip being deformed over a portion of its width to provide a groove having a length substantially greater than the diameter of one of said lead wires, said pair of leads being disposed side by side in said groove, said groove and said cover lip cooperating to provide a two part sleeve which closely embraces said leads over a distance substantially greater than the lead diameter to anchor the same in a predetermined position and to arrest leakage of compound around said leads during potting, said casing lip having an undeformed coplanar portion extending beyond said groove, a slot in said coplanar extended portion having a width less than the width of said groove and being substantially equal to the diameter of a lead wire, and being substantailly centered with respect to the width of said groove, said slot providing oppositely disposed wings at either side thereof, the vertical distance between the undersurface of said wings and bottom of said groove being no greater than the diameter of one of said leads, said leads being frictionally engaged between said groove and said wings to provide a strain relief permitting manipulating of said ballast by said leads prior to potting.

References Cited by the Examiner

UNITED STATES PATENTS

| | | | |
|---|---|---|---|
| 3,206,539 | 9/1965 | Kelly | 174—65 |

FOREIGN PATENTS

| | | |
|---|---|---|
| 235,554 | 10/1959 | Australia. |
| 324,066 | 1/1930 | Great Britain. |
| 466,824 | 6/1937 | Great Britain. |

LEWIS H. MYERS, *Primary Examiner.*

H. W. COLLINS, *Assistant Examiner.*